(12) United States Patent
Laifenfeld et al.

(10) Patent No.: US 9,278,589 B2
(45) Date of Patent: Mar. 8, 2016

(54) LOW LINE TPMS: SENSOR ASSOCIATION USING RSSI AND DOPPLER SIGNATURES WITH A SINGLE OR MULTIPLE ECUS

(71) Applicant: GM GLOBAL TECHNOLOGY OPERATIONS LLC, Detroit, MI (US)

(72) Inventors: Moshe Laifenfeld, Haifa (IL); Timothy J. Talty, Beverly Hills, MI (US); Douglas M. Kidd, Swartz Creek, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 135 days.

(21) Appl. No.: 14/108,009

(22) Filed: Dec. 16, 2013

(65) Prior Publication Data

US 2015/0165834 A1   Jun. 18, 2015

(51) Int. Cl.
*B60C 23/02* (2006.01)
*B60C 23/04* (2006.01)

(52) U.S. Cl.
CPC ......... *B60C 23/0437* (2013.01); *B60C 23/0416* (2013.01)

(58) Field of Classification Search
CPC  B60C 23/02; B60C 23/0408; B60C 23/0433; B60C 23/0416; B60C 23/0444; B60C 23/0493; B60C 23/0467; B60C 23/0496; B60C 23/0437
USPC ......... 340/442–448, 10.1, 10.6, 425.5, 426.3; 73/146.2–146.5, 416; 701/1, 2; 116/34 R, 34 A, 34 B; 152/151, 152.1, 152/415
See application file for complete search history.

(56) References Cited

U.S. PATENT DOCUMENTS

| | | | |
|---|---|---|---|
| 6,112,587 A | 9/2000 | Oldenettel | |
| 6,489,888 B1 * | 12/2002 | Honeck et al. | 340/442 |
| 6,788,193 B2 * | 9/2004 | King et al. | 340/447 |
| 7,385,494 B2 | 6/2008 | Mori et al. | |
| 7,425,892 B2 | 9/2008 | Mori et al. | |
| 7,574,293 B2 * | 8/2009 | Vredevoogd et al. | 701/36 |
| 7,817,026 B2 | 10/2010 | Watabe et al. | |
| 7,954,368 B2 | 6/2011 | Leman | |
| 8,193,927 B2 | 6/2012 | Maehara et al. | |
| 2002/0067285 A1 | 6/2002 | Lill | |

(Continued)

FOREIGN PATENT DOCUMENTS

| | | |
|---|---|---|
| EP | 2 014 489 A2 | 1/2009 |
| JP | 2012-187958 A | 10/2012 |

(Continued)

*Primary Examiner* — Anh V La
(74) *Attorney, Agent, or Firm* — John A. Miller; Miller IP Group, PLC

(57) ABSTRACT

A TPMS that uses a unique signature, such as RSSI signal levels and statistics or Doppler shift information, to identify the location of where the TPMS signal is being transmitted from. The TPMS includes a separate transmitter unit provided in each tire, where each transmitter unit transmits TPMS signals including an ID code identifying the tire and the pressure in the tire. The TPMS also includes a receiver unit that receives the TPMS signals from each of the transmitter units, where the receiver unit stores an average or other classification of the signature over time to identify the location of the transmitter unit for a particular ID code. The receiver unit compares the new received TPMS signals to the classified signals to identify whether the ID code indicates that the position of the tire has changed.

18 Claims, 2 Drawing Sheets

(56) References Cited

U.S. PATENT DOCUMENTS

| | | | |
|---|---|---|---|
| 2011/0304451 A1* | 12/2011 | Lickfelt et al. | 340/442 |
| 2012/0161931 A1* | 6/2012 | Karmakar et al. | 340/10.1 |
| 2012/0259507 A1 | 10/2012 | Fink | |
| 2013/0120127 A1 | 5/2013 | Sun et al. | |

FOREIGN PATENT DOCUMENTS

| | | |
|---|---|---|
| JP | 2012-240637 A | 12/2012 |
| JP | 2013-001345 A | 1/2013 |
| JP | 2013-100065 A | 5/2013 |

\* cited by examiner

LOW LINE TPMS: SENSOR ASSOCIATION USING RSSI AND DOPPLER SIGNATURES WITH A SINGLE OR MULTIPLE ECUS

BACKGROUND OF THE INVENTION

1. Field of the Invention

This invention relates generally to a tire pressure monitoring system (TPMS) that monitors the pressure and temperature of each tire on a vehicle and, more particularly, to a TPMS that monitors the pressure and temperature of each tire on a vehicle and uses a received signal strength indicator (RSSI) or Doppler shift information available from the received signal to identify which tire is transmitting the signal that is received by a receiver.

2. Discussion of the Related Art

All new vehicles manufactured and sold in the United States are required to have a tire pressure monitoring system (TPMS) that monitors the pressure and temperature of the tires on the vehicle. Typically, the TPMS is an active system that includes its own power source, such as a battery, and a processor for processing data. The TPMS includes a suitable pressure sensor that measures the pressure within each tire and a suitable temperature sensor that measures the temperature within the tire. Sensor signals from the pressure and temperature sensors are sent to the processor in each tire, which conditions and encodes the data and the encoded signals are then modulated onto a carrier wave to be transmitted by an antenna as a TPMS signal. The TPMS signals transmitted from each tire are received by a receiver at a suitable location within the vehicle, where the received data is demodulated, decoded and used to determine whether a warning signal should be given that the tire pressure is too high or too low, or the tire is too hot.

In one known TPMS, sometimes referred to as a low-line system, each tire transmits the TPMS signal including the pressure and temperature information to a single receiver located at a desirable position on the vehicle, where the TPMS signal includes an identification (ID) code that identifies the tire. During manufacture of the vehicle the TPMS algorithm is programmed so that the receiver knows the location of the tire for a particular ID code, i.e., right-front, left-front, right-rear or left rear. If the vehicle owner rotates the tires or replaces one of the tires with the spare tire, the particular tire or tires are now not in their original location, but the receiver will process the TPMS signals thinking that the tires are in their original position. In this situation, if a warning signal is given that a particular tire is under inflated, the vehicle operator may provide air to the wrong tire, possibly over inflating it.

Currently, on these types of systems, it is necessary for the vehicle owner to take the vehicle to a dealer or service center to retrain the TPMS to identify the new location of the tires on the vehicle if the original location of the tires is changed. Particularly, a technician will put the TPMS into a learn mode through a diagnostic interface on the vehicle, and position a tool including a magnet near the valve stem of each tire, which causes the processor in that tire to transmit its ID code to be received by the receiver. While in the learn mode, the technician will cause the processors in each tire to send the TPMS signal in a certain order so that the receiver relearns the location of which tire is associated with which ID code. Currently, with this type of system, there does not exist a technique where the vehicle owner can readily cause the TPMS to relearn the position of the tires if they are changed.

SUMMARY OF THE INVENTION

The following disclosure describes a TPMS that uses a unique signature, such as RSSI signal levels and statistics or Doppler shift information, to identify the location of where the TPMS signal is being transmitted from. The TPMS includes a separate transmitter unit provided in each tire, where each transmitter unit transmits TPMS signals including an ID code identifying the tire and the pressure and temperature in the tire. The TPMS also includes a receiver unit that receives the TPMS signals from each of the transmitter units, where the receiver unit stores an average or other classification of the signature over time to identify the location of the transmitter unit for a particular ID code. The receiver unit compares the new received TPMS signals to the classified signals to identify whether the ID code indicates that the position of the tire has changed.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a TPMS that employs RSSI or Doppler information to identify the location of a tire is merely exemplary in nature, and is in no way intended to limit the invention or its applications or uses.

Figure 1:
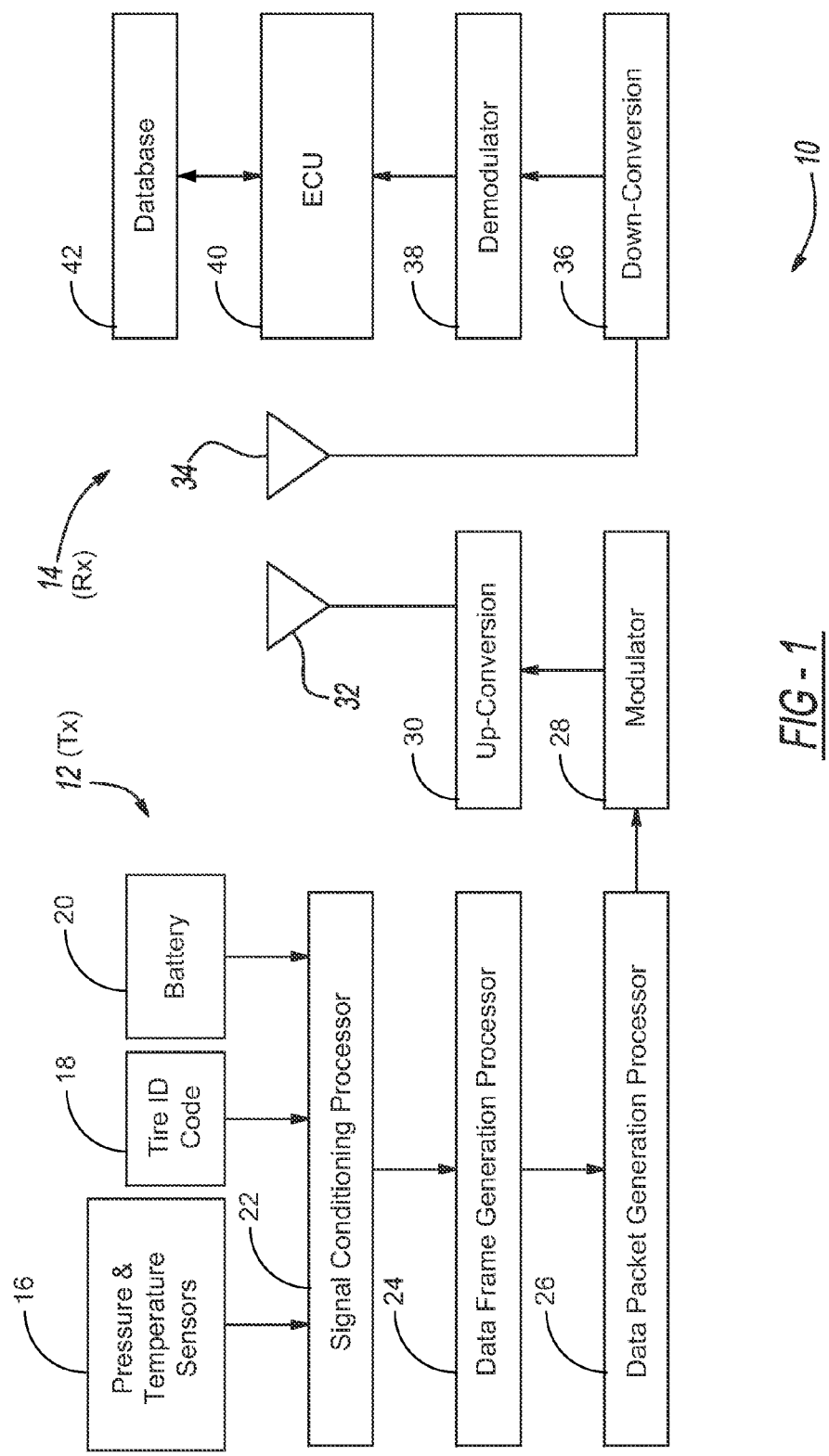
FIG. 1 is a schematic block diagram of a tire pressure monitoring system (TPMS)

FIG. 1 is a schematic block diagram of a TPMS 10 including a transmitter unit 12 and a receiver unit 14. The transmitter unit 12 is located at a suitable location within each vehicle tire and includes pressure and temperature sensors 16 that provide temperature and pressure measurement signals. Further, a tire identification (ID) code identifying a particular tire is provided at box 18 and a battery 20 provides battery power for the unit 12. The pressure and temperature sensors 16 in the tire provide measurement signals to a signal conditioning processor 22 that conditions the signals to be suitable for transmission. The conditioned signals are sent to a data frame generation processor 24 where the data frames are generated, and the data frames are sent to a data packet generation processor 26 where they are modulated onto a carrier wave by a modulator 28, up-converted by an up-conversion circuit 30 and transmitted as a TPMS signal by an antenna 32. The TPMS signals from the antenna 32 are received by an antenna 34 in the receiver unit 14 where they are down-converted by a down-conversion circuit 36. The down-converted signals are demodulated by a demodulator 38 to remove the carrier wave and the separated data frames are sent to a microcontroller or electronic control unit (ECU) 40 that processes the data that was transmitted. The ECU 40 may provide a warning signal on a vehicle BUS indicating that a particular tire has a low pressure, which can be displayed to the vehicle driver in a manner well understood by those skilled in the art. Further, certain information available on the TPMS signal received by the receiver unit 14 is stored in a database 42 for reasons that will become apparent from the discussion below.

Figure 2:
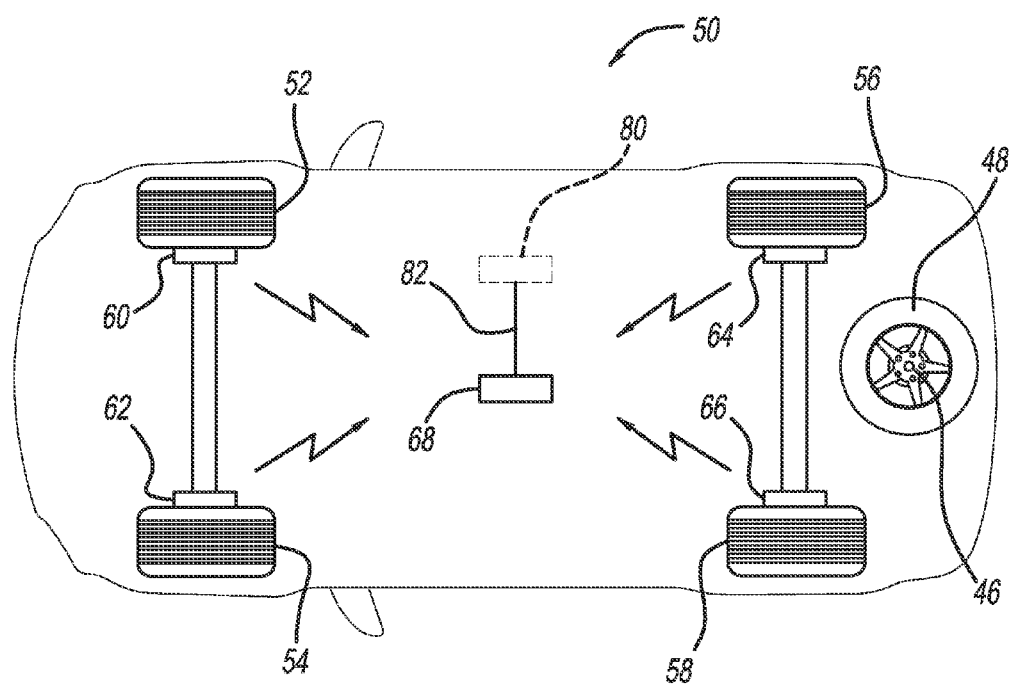
FIG. 2 is an illustration of a vehicle including a TPMS.

FIG. 2 is an illustration of a TPMS on a vehicle 50. The vehicle 50 includes front tires 52 and 54, rear tires 56 and 58 and a spare tire 48, where each tire 48 and 52-58 includes a transmitter unit of the type discussed above. Particularly, the tire 52 includes a transmitter unit 60, the tire 54 includes a transmitter unit 62, the tire 56 includes a transmitter unit 64, the tire 58 includes a transmitter unit 66 and the tire 48 includes a transmitter unit 46. The TPMS includes a receiver 68 positioned at any suitable location on the vehicle 50, such as in the vehicle trunk, in the vehicle dashboard, etc. Signals wirelessly transmitted by the transmitter units 46 and 60-66 include the ID code identifying the units 46 and 60-66, and thus the particular tire so that the ECU in the receiver 68 can identify which tire 48 and 52-58 may be having pressure or temperature issues. If the tires 52-58 are interchanged, for example, rotated, or removed and replaced with the spare tire 48, the ID code in the TPMS signals for a particular transmitter unit 46 and 60-66 will not identify the original location for that tire.

As will be discussed in detail below, this disclosure proposes a TPMS that uses available and existing information in the TPMS signal transmitted from each tire 48 and 52-58 to identify the location of that tire. For example, communications systems of the type typically employed in a TPMS include a received signal strength indicator (RSSI) that identifies the strength of the signal when it is received at the receiver 68. As is known in the art, RSSI is a statistical measure exposed to noise and other signal variations in a wireless channel. More specifically, the signal received by the receiver 68 will have a unique envelope of the carrier wave that the RF signal is modulated on.

Because the signal is transmitted wirelessly, the RF transmission is attenuated and reflected by the various vehicle components and parts that are between the particular tire 48 and 52-58 and the receiver 68. Therefore, even though each transmitter unit 46 and 60-66 might transmit the TPMS signal with the same or nearly the same power, attenuation of the signal will cause the signal level and statistics of the RSSI of the signals transmitted from the different tires to be different when they are received at the receiver 68. For example, because the tire 48 and 52-58 is positioned within a wheel well of the vehicle body, and that wheel well has various shapes for different vehicle designs, the transmitted signal gets attenuated and reflected differently from each tire 48 and 52-58. This will result in different signal levels and signal statistics for each location. Also, the distance that the transmitter unit 46 and 60-66 is from the receiver 68 will affect the RSSI.

The ECU in the receiver 68 will, in a training operation, store a history of signal levels and signal statistics, herein referred to as RSSI signatures, such as the average of the RSSI, varying of the RSSI over time, etc., for each ID code so that the location of each tire 48 and 52-58 can be identified by a particular RSSI signature. The algorithm may require a "learn time" where a certain number of the TPMS signals are used to provide the history before being used to identify the location of the tire. If the tires 48 and 52-58 are rotated or otherwise moved where a tire is put in a different location on the vehicle 50, the new transmission signal from the different transmitter unit 46 and 60-66 on a particular tire 48 and 52-58 will be attenuated in the same manner as the original signal from the originally positioned transmitter unit 46 and 60-66 making the signature from that signal similar to what was previously transmitted from that location even though it is being transmitted from a different transmitter unit 46 and 60-66. The algorithm can compare the RSSI signature for a particular received TPMS signal having a certain ID code to the stored history for that ID code and determine that the tire has been moved if the RSSI signature does not match the stored history for that ID code. More particularly, by storing the RSSI signature for each tire as the signals are received in the receiver 68 and classifying the RSSI signature based on its history, each classification will be identifiable from the other classifications, so that if the tires are moved, the classification will then identify the new location of the tire. The algorithm may require that the RSSI signature not match the stored history for that ID code a certain number of times before the algorithm concludes that the tire 48 and 52-58 has been moved. Since there are only four possible locations for a particular tire 48 and 52-58 on the vehicle 50, identifying the location of the tire 48 and 52-58 can be converted to a simple classification problem using, for example, principle component analysis.

Figure 3:
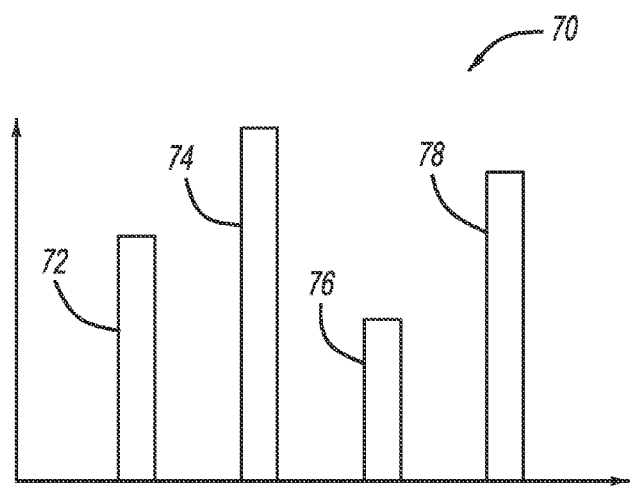
FIG. 3 is a graph showing one possible technique for classifying TPMS signal location.

FIG. 3 is a general representation of how the RSSI can be classified for each of the tires 52-58. For example, as each of the signals from the units 60-66 is received by the receiver 68 the strength of the signal with a particular ID code will be averaged with some rolling number of previously received signals for that ID code to provide an average RSSI, where each of the averages for each of the tires 52-58 is represented by bars 72, 74, 76 and 78.

Employing the RSSI signature of the received TPMS signal as an indicator of the location of the transmission of the TPMS signal is one technique for identifying that location. The present disclosure contemplates other techniques for differentiating the signals received from the tires 48 and 52-58 to identify their location other than using correlation of the RSSI. For example, because the tires 52-58 are rotating, the transmitter unit 60-66 within the tire 52-58 at any particular point in time will be moving towards or away from the receiver 68. Because the transmitter unit 60-66 is moving relative to the receiver 68 as it is transmitting, the signal being transmitted has a Doppler shift in frequency, either a higher frequency when the transmitter unit 60-66 is moving towards the receiver 68 or a lower frequency when the transmitter unit 60-66 is moving away from the receiver 68. Because the signals received by the receiver 68 will be coming from a different angle relative to the position of the tire, that Doppler shift can be used to identify the angle and thus the location of the tire. Therefore, a particular tire having a particular ID code will have its position known by the shift in the transmission frequency from its location.

Further, each TPMS signal received by the receiver 68 will have a unique phase associated with it because of the location of the tire 48 and 52-58 relative to the receiver 68. If the receiver 68 is able to measure that phase it may be able to classify the location of the tire 48 and 52-58. Alternatively, because the tire 48 and 52-58 is rotating, the orientation of the transmitter unit 60-66 relative to the receiver 68 changes during operation of the vehicle 50, where the signal will have a different polarization as the tire 48 and 52-58 rotates. If the receiver 68 is able to measure that polarization, it may be able to uniquely classify the location based on the polarization.

In an alternate embodiment, multiple receivers can be employed at different locations on the vehicle 50 where the receivers are in communication with each other over a vehicle CAN bus 82 or other bus. This is represented in FIG. 2 as additional receiver 80. Because the receivers 68 and 80 are at different locations on the vehicle 50, there will be a diversity in the channels for the receivers 68 and 80 that can be measured, where if the location of the tire 48 and 52-58 changes, the ECUs in the receivers 68 and 80 can determine the location of that change in combination with each other.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A tire pressure monitoring system (TPMS) for a vehicle having a plurality of tires, said system comprising:
    a plurality of transmitter units where a separate transmitter unit is provided in each tire, and where each transmitter unit transmits TPMS signals including data identifying the tire and the pressure in the tire; and
    at least one receiver unit receiving the TPMS signals from each of the transmitter units, said at least one receiver unit identifying a signature in each of the TPMS signals and classifying the signatures over time to provide a training set signature representing a location of the transmitter units, where the signature includes a Doppler frequency shift of the received signal associated with tire-rotation-induced cyclical changes in velocity of the transmitter unit in each tire relative to the receiver unit.

2. The TPMS according to claim 1 wherein the at least one receiver unit classifies the signature in the received TPMS signals as compared to the training set signatures to determine that the location of a tire has changed.

3. The TPMS according to claim 2 wherein the at least one receiver identifies a new location of a tire by identifying that the signature of a received TPMS signal for that tire matches the training set signature for a different signature of another tire.

4. The TPMS according to claim 3 wherein the data identifying the tire is an identification (ID) code, and wherein the at least one receiver unit determines that the location of a tire has changed if the signature of the tire is classified for the location of a training set signature of a tire having a different ID code.

5. The TPMS according to claim 1 wherein the at least one receiver is two receivers where both receivers receive the TPMS signals from each of the transmitter units, store the unique signatures of each of the TPMS signals over time to provide a separate classification of a location of the transmission of each of the signals, and classifies the received TPMS signals to the training set signatures.

6. The TPMS according to claim 5 wherein the two receivers are located at different locations on the vehicle.

7. The TPMS according to claim 1 wherein the signature includes a received signal strength indicator.

8. The TPMS according to claim 1 wherein the signature includes a phase of the signal.

9. The TPMS according to claim 1 wherein the signature includes a polarization of the signal.

10. A tire pressure monitoring system (TPMS) for a vehicle having a plurality of tires, said system comprising:
    a plurality of transmitter units where a separate transmitter unit is provided in each tire, and where each transmitter unit transmits TPMS signals including an identification (ID) code identifying the tire and the pressure in the tire; and
    at least one receiver unit receiving the TPMS signals from each of the transmitter units, said at least one receiver unit identifying a received signal strength indicator (RSSI) in each of the TPMS signals and classifying the RSSI over time to provide a training set RSSI identifying a location of the transmitter units, wherein the at least one receiver unit compares the RSSI in the received TPMS signals to the training set RSSIs to determine that the location of a tire has changed and identifies a new location of a tire by identifying that the RSSI of a received TPMS signal for that tire matches the training set RSSI for a different RSSI of another tire, where the at least one receiver unit also identifies a Doppler frequency shift of the TPMS signal associated with tire-rotation-induced cyclical changes in velocity of the transmitter unit in each tire relative to the receiver unit, and uses the Doppler frequency shift along with the RSSI to correlate received signals with training sets.

11. The TPMS according to claim 10 wherein the at least one receiver is two receivers where both receivers receive the TPMS signals from each of the transmitter units, store the RSSI signal levels and statistics referred to as RSSI signatures of each of the TPMS signals over time to provide a separate training set RSSI of a location of the transmission of each of the signals, and compare the received TPMS signals to the training set RSSIs to determine whether the signal has changed.

12. The TPMS according to claim 11 wherein the two receivers are located at different locations on the vehicle.

13. A method for identifying the location of a tire on a vehicle having a plurality of tires in a tire pressure monitoring system (TPMS), said method comprising:
    transmitting TPMS signals from a plurality of transmitter units where a separate transmitter unit is provided in each tire, where the TPMS signals including data identifying the tire and the pressure in the tire;
    receiving the TPMS signals by at least one receiver unit receiving the TPMS signals from each of the transmitter units;
    identifying a signature in each of the TPMS signals and classifying the signatures over time to provide a separate training set signature of a location of the transmitter units, where the signature includes a Doppler frequency shift of the received signal associated with tire-rotation-induced cyclical changes in velocity of the transmitter unit in each tire relative to the receiver unit; and
    comparing the signature in the received TPMS signals to the training set signatures to determine that the location of a tire has changed.

14. The method according to claim 13 wherein comparing the signature in the received TPMS signals to the training set signatures includes identifying a new location of a tire by identifying that the signature of a received TPMS signal for that tire matches the training set signature for a training set signature of another tire.

15. The method according to claim 14 wherein the data identifying the tire is an identification (ID) code, and wherein comparing the signature in the received TPMS signals to the training set signatures includes determining that the location of a tire has changed if the signature of the tire is classified for the location of a signature of a tire having a different ID code.

16. The method according to claim 13 wherein the signature includes a received signal strength indicator.

17. The method according to claim 13 wherein the signature includes a phase of the signal.

18. The method according to claim 13 wherein the signature includes a polarization of the signal.

* * * * *